Figure 1:
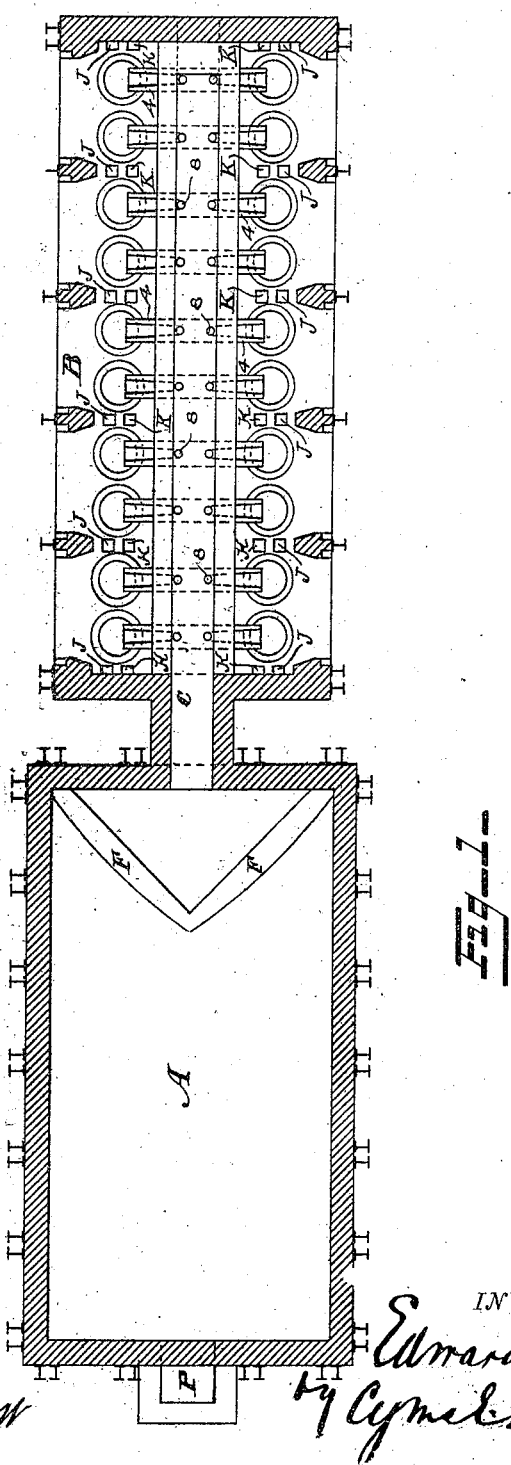

No. 629,557. Patented July 25, 1899.
E. FORD.
GLASS FURNACE.
(Application filed Oct. 13, 1898.)
(No Model.) 3 Sheets—Sheet 1.

WITNESSES. INVENTOR.

No. 629,557. Patented July 25, 1899.
E. FORD.
GLASS FURNACE.
(Application filed Oct. 13, 1898.)
(No Model.) 3 Sheets—Sheet 2.

WITNESSES. INVENTOR.
Amelia Williams Edward Ford
Beatrice McDermott. by Cyrus Lothrop
Attorney No. 629,557. Patented July 25, 1899.
E. FORD.
GLASS FURNACE.
(Application filed Oct. 13, 1898.)
(No Model.) 3 Sheets—Sheet 3.

WITNESSES. INVENTOR.

UNITED STATES PATENT OFFICE.

EDWARD FORD, OF WYANDOTTE, MICHIGAN.

GLASS-FURNACE.

SPECIFICATION forming part of Letters Patent No. 629,557, dated July 25, 1899.

Application filed October 13, 1898. Serial No. 693,437. (No model.)

*To all whom it may concern:*

Be it known that I, EDWARD FORD, of Wyandotte, in the county of Wayne and State of Michigan, have invented a new and useful Improvement in Glass-Furnaces, of which the following is a specification.

Up to the present time the best known apparatus for the manufacture of "plate" or rolled glass from the raw material and those which are now employed have required the use of melting and refining furnaces generally containing from sixteen to twenty (or even more) pots each. Into these pots the mixture of raw material (commonly called "batch") from which the glass is made is placed and is there melted by long and continuous firing for a period of from twelve to fifteen hours or even longer. In order to complete the melting and refining of the glass, such extreme heat is necessary that a very considerable loss of time (varying from three to four hours) is usually required for the reduction of the temperature of the furnaces and molten glass (or "metal," as it is commonly called) before the latter can be rolled into plates, for the reason that if the melted glass be at too high a temperature it will be too liquid to be successfully poured on the rolling beds or tables, where it is to be rolled into plates. The extreme heat to which the pots (which are very costly) are subjected during the process of melting (over 3,000° Fahrenheit) tends to soften and weaken the walls of the pots very materially, and this weakening, together with the pressure of the liquid metal upon the interior, frequently causes them to break during this stage of the process, thereby causing a great loss of both pots and metal. This heating of the melted glass in the manufacture of plate-glass to a temperature considerably in excess of that at which it can be worked is necessary for the proper refining of the metal, by the term "refining" being meant the expulsion of all air or gases which would otherwise form bubbles in the glass and materially impair its appearance and value, the refining of the liquid glass or metal to the required degree being much more difficult in the manufacture of plate-glass than in the manufacture of sheet or other blown glass.

In the manufacture of sheet and other blown glass the batch or raw material is sometimes melted in a tank-furnace and dipped from the tank into pots, which are then placed in another or refining furnace, (separate from the tank-furnace,) where the melted glass is again heated and refined before being drawn off in condition for working, (thus endangering the pots, as above stated,) and glass for blowing is often taken directly from a tank-furnace in which it is melted without being placed in pots at all; but neither of these processes is well adapted for the manufacture of plate-glass, the process and apparatus first described being the best heretofore known for the successful manufacture of that kind of glass.

The object of my invention is to provide a suitable, simple, and effective apparatus for use in the manufacture of plate-glass whereby the batch may be melted in a tank-furnace and the molten glass or metal thence drawn or allowed to flow into pots in a refining-furnace in such a manner that it is both refined and cooled to such a degree during its passage from the melting-tank to the pots as will permit, if desired, of its being at once drawn from the pots and rolled into plates without further loss of time, the drawing of the metal from the melting-tank to the pots being effected without dipping or otherwise handling the same, means also being provided for conveniently regulating the temperature of the refining-furnace as desired, thereby effecting a very considerable saving in time, labor, and material over the methods at present employed in the manufacture of plate-glass.

While my invention and improvement is more especially designed for use in the manufacture of plate or rolled glass, it is of course applicable in the manufacture of other kinds of glass, such as sheet or other blown glass, although obviously it may not in all cases effect an equal saving over the apparatus now in use for the manufacture of such other forms of glass; but apparatus embodying my invention will, I believe, be a very material improvement over any existing apparatus for the manufacture of any kind of glass which it is necessary or desirable to refine very thoroughly before working, whether the same is to be rolled, blown, or otherwise treated.

Figure 2:
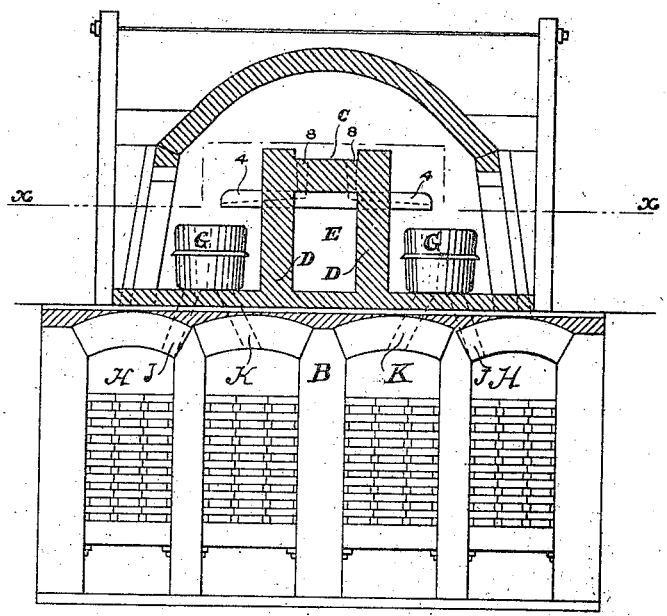
Figure 4:
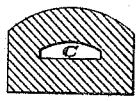
Figure 3:
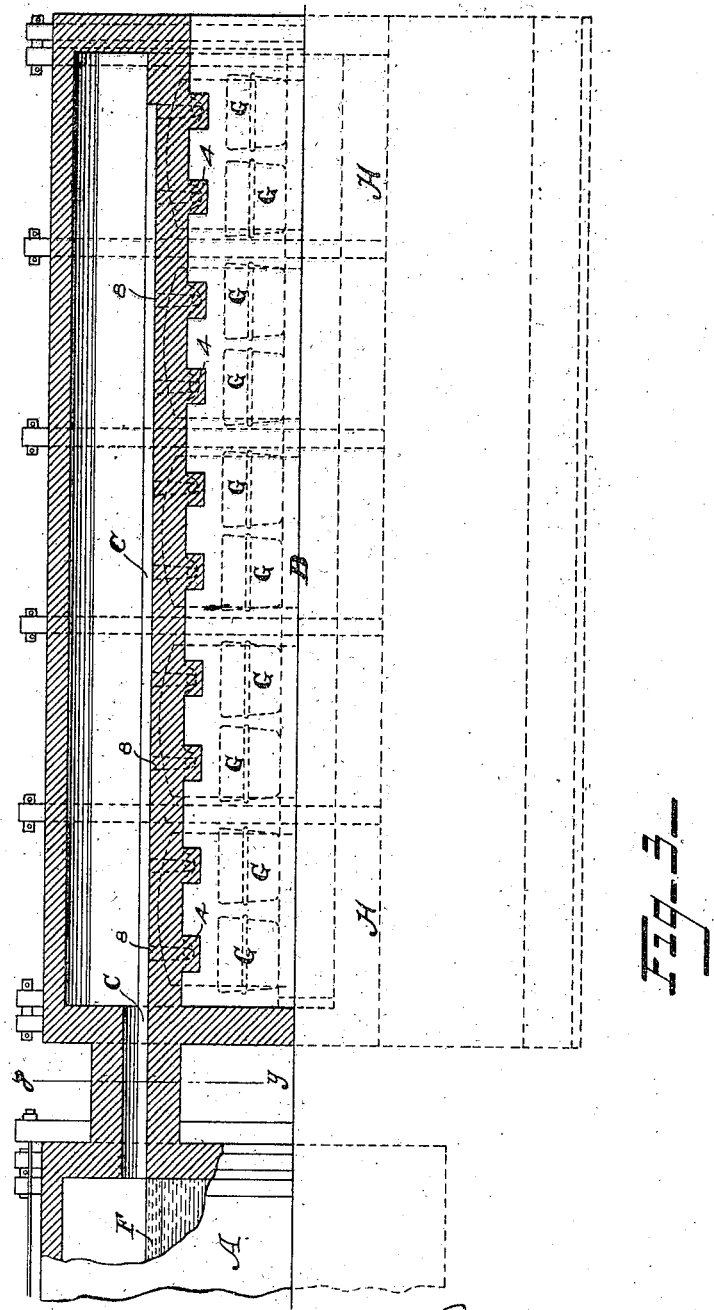

Referring to the accompanying drawings, which are illustrative of a form of combination melting-tank and pot refining-furnace embodying my invention, Figure 1 is a view of the melting-tank and refining-furnace in part horizontal section through the lines $xx$, Fig. 2, at the sides of the refining-furnace and shows in part plan view a longitudinally-extended trough or conduit that connects said tank and furnace and through which conduit and its spouts the molten glass is conducted to the pots. Fig. 2 represents a vertical transverse section through the refining-furnace. Fig. 3 represents a vertical longitudinal section through the refining-furnace and the passage by which it is connected with the melting-tank, a portion of the latter being also shown in section; and Fig. 4 is a transverse section through the connecting-passage between the melting-tank and the refining-furnace on the line $yy$, Fig. 3.

A represents a tank-furnace for the melting of the raw material, which may be made of any usual material and appropriate construction (it differing from the melting-tank furnaces in common use only in its connection with the refining-furnace, as hereinafter explained) and which is provided with the usual opening P for the introduction of the batch or raw material and with floating bridges F F, which float upon the surface of the molten glass and prevent the impurities rising to and floating upon the surface of the latter from escaping when the glass is drawn off or allowed to flow into the refining-furnace.

B represents a refining-furnace in which the pots G G are placed, under which are the air and gas chambers or regenerators H H, connected with the upper part of the furnace by the air and gas ports J J K K, by means of which air and gas may be admitted as desired by the operator for the purpose of regulating the temperature of the refining-furnace. The melting-tank and the refining-furnace are connected by a passage or conduit C, which extends throughout the length of the refining-furnace and is supported in the latter upon the walls D D, between which is an air-space E, into which air may be admitted for the purpose of cooling the walls and conduit, thereby assisting in the cooling of the metal in its passage along the conduit to the desired temperature. In the conduit are openings 8 8, connecting with troughs or spouts 4 4, leading to the pots G G, by means of which the metal is withdrawn from the conduit into the pots as desired. The openings 8 8, leading from the conduit to the pots, should be provided with suitable means for closing the same and preventing the escape of metal into the pots except as desired. Suitable means for closing the passage between the melting-tank and the refining-furnace may also be provided if found necessary or desirable.

The conduit C should be constructed with a slight downward incline from the melting-tank to the farther end of the refining-furnace, so as to induce and permit a free and easy flow of the molten glass to its extreme end.

The method of operation of the apparatus above described is as follows: When the raw material is thoroughly melted, the molten glass rising to the surface in the melting-tank in a thoroughly molten (but unrefined) condition and reaching above the level of the opening of the conduit C flows slowly in a shallow stream into the refining-furnace to the extreme end of the conduit, the dross or impurities on its surface being prevented from escaping with it from the tank by the floating bridges F F. The slight depth of the current of molten metal in the conduit (which should not exceed one or one and one-half inches) readily permits the rapid escape of the gases contained in the metal when it leaves the tank and also of its rapid cooling, so that it may be drawn off through the openings in the conduit into the pots G G in a thoroughly-refined condition and at a temperature which will not tend to weaken or destroy the pots and which will permit of the metal being drawn off from the pots for rolling into plates without further loss of time. By the use of the air and gas chambers or regenerators H H and the pots connecting the same with the refining-furnace the temperature of the latter may be regulated by the operator as may be required for keeping the metal in the pots in a proper condition for working by the introduction of more or less gas or air.

As an illustration of the saving effected by my invention it may be stated that by the old process the usual production from a twenty-pot furnace, which requires twenty-five to thirty men to operate it, is about three thousand square feet of plate-glass in twenty-four hours, while by the use of an apparatus embodying my invention the production will be increased (using the same number of pots) to ten thousand square feet in the same period of time, while only twenty-one men will be required to operate it when working continuously. It will be readily seen, therefore, that by the use of my invention a very great saving may be effected in the cost of production.

It is evident that the construction and arrangement of the various parts of an apparatus embodying my invention may be considerably varied from the precise forms and arrangement shown in the drawings, and I do not wish to limit myself to the precise construction therein shown, the same being merely one form of a combination tank-and-pot refining-furnace embodying my invention, which form I believe to be a desirable and preferable one.

Having thus described my invention, what I claim, and desire to secure by Letters Patent, is—

1. In apparatus for the manufacture of glass, the combination of a tank-furnace, a refining-furnace, a conduit extended longitudinally throughout the refining furnace and through which it communicates with the tank-furnace, spouts extended laterally from said conduit, and means for supporting pots in said refining-furnace beneath said spouts, substantially as described.

2. In apparatus for the manufacture of glass, the combination of a tank-furnace, a refining-furnace having therein a longitudinally-extended conduit and an air-space beneath the same, said conduit being in communication with the tank-furnace, spouts extended laterally from said conduit, and means for supporting pots in said refining-furnace beneath said spouts, substantially as described.

3. In apparatus for the manufacture of glass, the combination of a tank-furnace, a refining-furnace having a central air-space therein with longitudinally-extended walls on each side of said space, a conduit extended longitudinally throughout the refining-furnace above said air-space and communicating at one end with the tank-furnace, spouts extended laterally from both sides of said conduit, and pots arranged in the refining-furnace beneath said spouts, substantially as described.

EDWARD FORD.

Witnesses:
E. LEYDEN FORD,
J. B. FORD. Jr